(12) United States Patent
Tillery

(10) Patent No.: US 7,802,330 B2
(45) Date of Patent: Sep. 28, 2010

(54) DISPOSABLE PROTECTIVE COVERING FOR BEDS AND PILLOWS

(76) Inventor: Andre Daval Tillery, 2115 W. 115th St., Chicago, IL (US) 60643

( * ) Notice: Subject to any disclaimer, the term of this patent is extended or adjusted under 35 U.S.C. 154(b) by 0 days.

(21) Appl. No.: 12/499,307

(22) Filed: Jul. 8, 2009

(65) Prior Publication Data

US 2010/0009587 A1    Jan. 14, 2010

Related U.S. Application Data

(60) Provisional application No. 61/134,252, filed on Jul. 8, 2008.

(51) Int. Cl.
*A47G 9/00* (2006.01)
*B32B 37/00* (2006.01)

(52) U.S. Cl. .................. 5/487; 156/73.1; 442/394; 442/398

(58) Field of Classification Search .............. 5/482, 5/484, 487, 490, 495, 500, 501, 502; 156/93, 156/73.1
See application file for complete search history.

(56) References Cited

U.S. PATENT DOCUMENTS

| | | | | |
|---|---|---|---|---|
| 5,249,320 | A | * | 10/1993 | Moretz et al. ............... 5/484 |
| 2002/0178506 | A1 | * | 12/2002 | Corzani et al. ............... 5/737 |
| 2007/0056110 | A1 | * | 3/2007 | Tuoriniemi et al. ........... 5/655 |
| 2009/0082744 | A1 | * | 3/2009 | Hakansson et al. ......... 604/365 |

* cited by examiner

*Primary Examiner*—Arti Singh-Pandey
(74) *Attorney, Agent, or Firm*—Triangle Patents

(57) ABSTRACT

Products and materials providing disposable protective covering for beds and pillows.

3 Claims, 2 Drawing Sheets

DISPOSABLE PROTECTIVE COVERING FOR BEDS AND PILLOWS

CROSS-REFERENCE TO RELATED APPLICATIONS

This non-provisional utility patent application is related to one or more prior filed co-pending applications, it claims priority from U.S. provisional patent application Ser. No. 61/134,252 filed Jul. 8, 2008, which is incorporated herein by reference in its entirety.

BACKGROUND OF THE INVENTION

1. Field of the Invention

The present invention relates generally to bedding, and more particularly, to disposable protective covering products for beds and pillows.

2. Description of the Prior Art

There are protective sheeting materials in the prior art; however, these are substantial sheeting materials that are thick, expensive and are constructed and intended to be used on an ongoing, multi-year basis. In hospital and other group residences or treatment facilities, it is necessary for using protective bedding, but the commercially available materials are too expensive and cumbersome to change daily or multiple times per day. Thus there remains a need for low cost, lightweight protective coverings for beds and pillows.

SUMMARY OF THE INVENTION

A first aspect of the present invention is to provide a disposable protective covering for beds and pillows comprising a 3-layer stratified protective covering material that is cut, sewn, and tailored to form a disposable, protective bedding product, including a base layer having a hydrophilic nonwoven material.

A second aspect of the present invention is to provide a method for producing disposable protective coverings for beds and pillows including the steps of:

combining at least one pulp-based product with a hydrophilic nonwoven material;

adhering the at least one pulp-based product to the hydrophilic nonwoven material to form an integrated stratified covering material; and combining and attaching a top layer, preferably by the application of an adhesive, onto the integrated stratified covering material to create a 3-layer stratified protective covering material that is cut, sewn, and tailored to form a disposable, protective bedding product. Preferably, the step of combining includes ultrasound processing, which may also create patterns on the surface of the integrated stratified covering material.

The present invention products and methods provide for worry-free, disposable mattress and pillow liners or coverings that are lightweight, inexpensive and designed and constructed to stop spills, bodily fluids, flaky skin, and bed bugs or other pests. It is preferably hypoallergenic, lightweight, simple to use, soft and comfortable, absorbent, waterproof, and fits conveniently underneath a regular or standard sheet. It protects mattresses and pillows from stains and wetting.

In one embodiment, the mattress bed and pillow covering of the present invention is preferably made with a disposable, waterproof elastic-edged 3-layer stratified protective covering material that is cut, sewn, and tailored to form a disposable, protective bedding product, including a base layer having a hydrophilic nonwoven material. It is adapted to fit onto a mattress underneath a standard sheet. It prevents liquids and other materials from coming into contact with, soiling or wetting the mattress or pillow. There is a soft top layer for comfort.

These and other aspects of the present invention will become apparent to those skilled in the art after a reading of the following description of the preferred embodiment when considered with the drawings, as they support the claimed invention.

DETAILED DESCRIPTION

Figure 1:
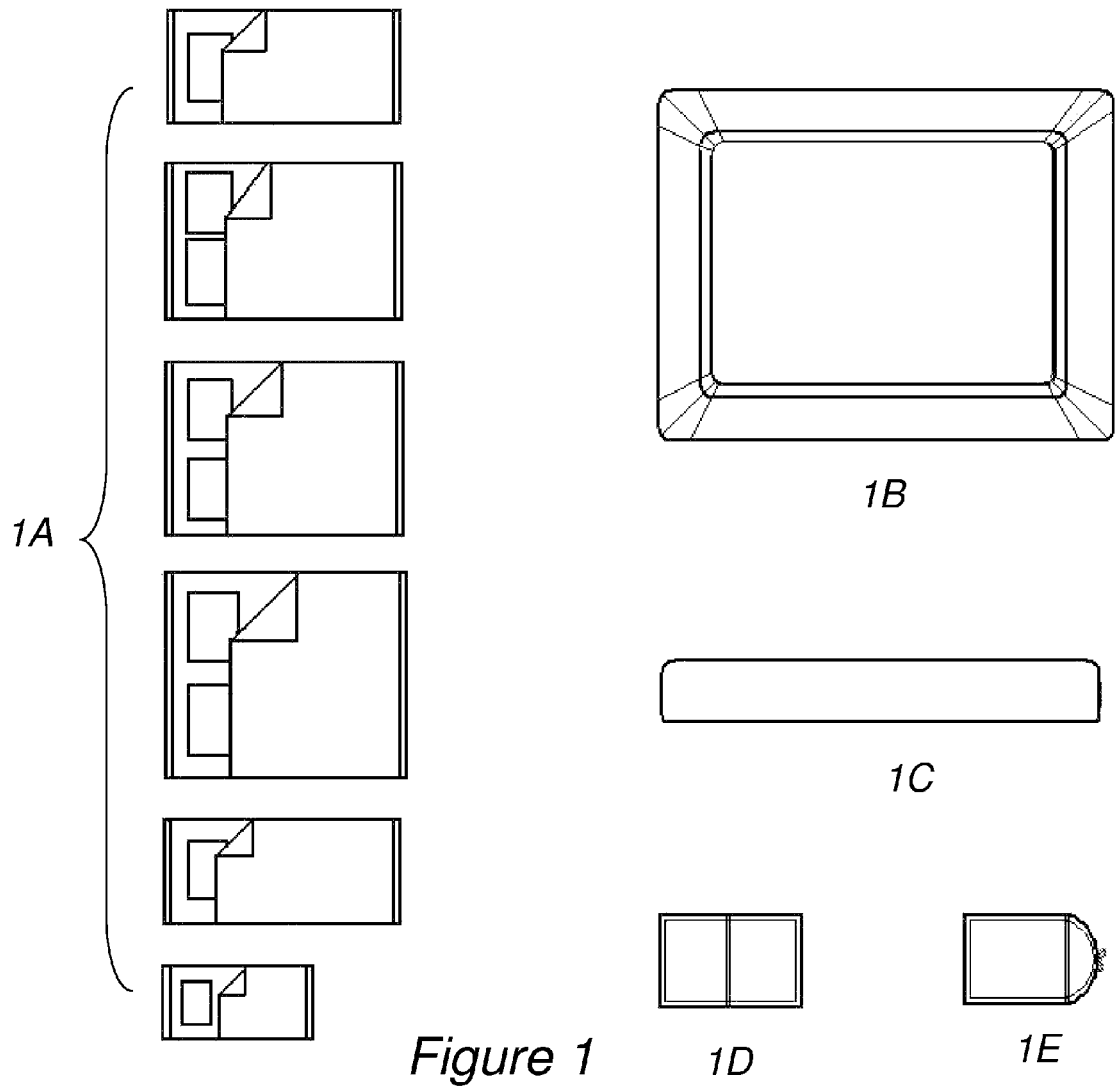
FIG. 1 illustrates a series of related views including top view, side view, end view, and sized top views of one embodiment of the present invention.

Referring now to the drawings in general, the illustrations are for the purpose of describing a preferred embodiment of the invention and are not intended to limit the invention thereto.

FIG. 1 illustrates a series of related views including top view, side view, end view, and sized top views of one embodiment of the present invention. The present invention provides for a disposable protective covering for beds and pillows comprising a 3-layer stratified protective covering material that is cut, sewn, and tailored to form a disposable, protective bedding product, including a base layer having a hydrophilic nonwoven material. Preferably, the pulp-based material is a pectic or wood pulps material. Also, preferably, the top layer is a sheeting layer and more preferably is formed from polyethylene.

Figure 2:
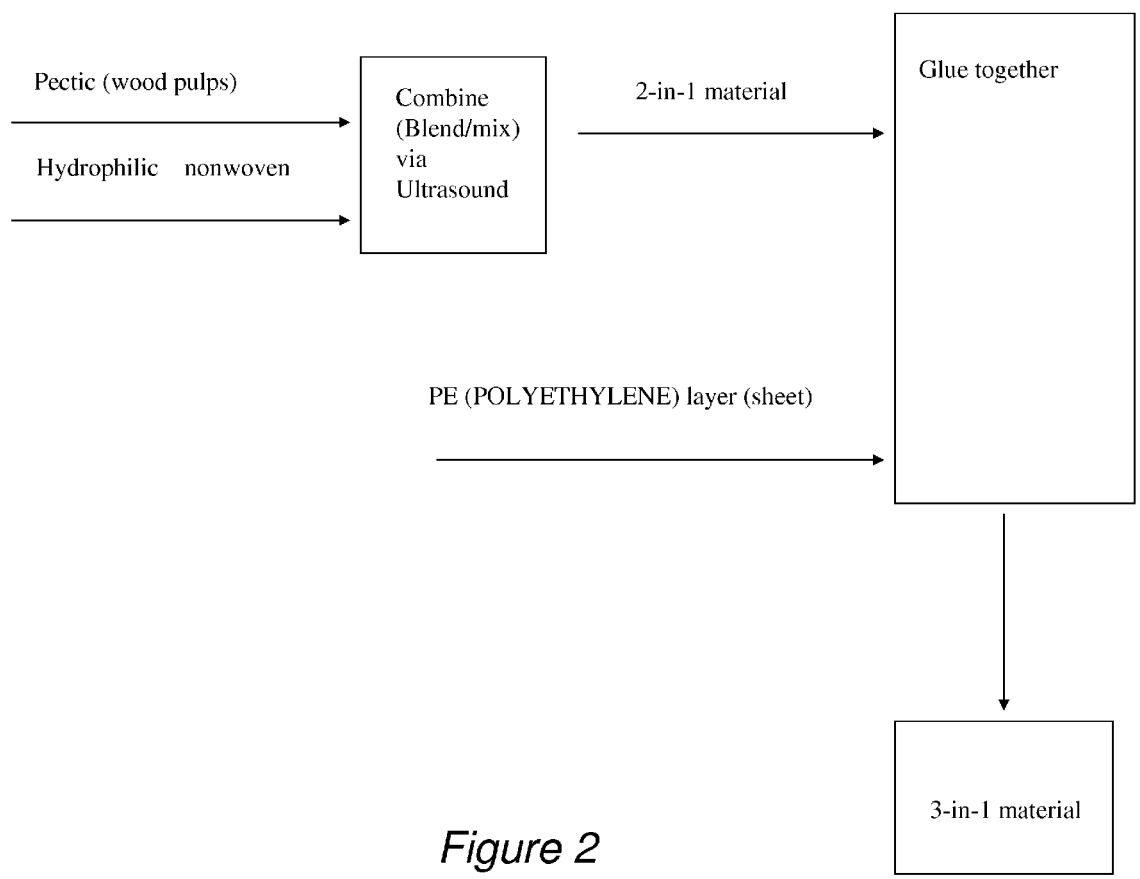
FIG. 2 illustrates a flow diagram illustrating steps according to a method in one embodiment of the present invention.

The present invention also provides a method for producing disposable protective coverings for beds and pillows including the steps of:

combining at least one pulp-based product with a hydrophilic nonwoven material;

adhering the at least one pulp-based product to the hydrophilic nonwoven material to form an integrated stratified covering material;

combining and attaching a top layer, preferably by the application of an adhesive, onto the integrated stratified covering material to create a 3-layer stratified protective covering material that is cut, sewn, and tailored to form a disposable, protective bedding product. Preferably, the step of combining includes ultrasound processing, which may also create patterns on the surface of the integrated stratified covering material. FIG. 2 illustrates a flow diagram illustrating steps according to the aforementioned method steps in one embodiment of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A disposable protective covering for beds and pillows comprising a 3-layer stratified protective covering material that is combined using ultrasound processing and cut, sewn, and tailored to form a disposable, protective bedding product, including a base layer having a hydrophilic nonwoven material.

2. A method for producing disposable protective coverings for beds and pillows comprising the steps of:

combining at least one pulp-based product with a hydrophilic nonwoven material;
adhering the at least one pulp-based product to the hydrophilic nonwoven material using ultrasound processing to form an integrated stratified covering material;
combining and attaching a top layer onto the integrated stratified covering material to create a 3-layer stratified protective covering material that is cut, sewn, and tailored to form a disposable, protective bedding product.

3. The method of claim 2, wherein the step of attaching the top layer includes application of an adhesive.

* * * * *